A. SCOULLER.
Oatmeal-Machine.

No. 221,108.    Patented Oct. 28, 1879.

WITNESSES
Jesse Lea Jr.
Ernst Jebsen

INVENTOR
Alexander Scouller
Per M. E. Dayton
Attorney

N. PETERS, PHOTO-LITHOGRAPHER, WASHINGTON, D. C.

UNITED STATES PATENT OFFICE.

ALEXANDER SCOULLER, OF OTTUMWA, IOWA.

IMPROVEMENT IN OATMEAL-MACHINES.

Specification forming part of Letters Patent No. 221,108, dated October 28, 1879; application filed May 12, 1879.

*To all whom it may concern:*

Be it known that I, ALEXANDER SCOULLER, of Ottumwa, in the State of Iowa, have invented certain new and useful Improvements in Oatmeal-Mills; and I do hereby declare that the following is a full, clear, and exact description thereof, reference being had to the accompanying drawings, and to the letters of reference marked thereon, which form a part of this specification.

My invention relates to an apparatus for cutting or slicing oats in the preparation of oatmeal for table use; and it consists in combining a reciprocating hopper having a bottom provided with rows of perforations to direct the grain, and a series of slotted plates connected with the hopper and with each other to reciprocate with the hopper, with an alternating series of stationary slotted plates, the movement of the reciprocating plates being so adjusted with reference to the velocity of the falling grain that any kernel received within the slots, when coincident, will be caught and cut between the several plates by the edges of the slots into parts of uniform size.

Apparatus having only two plates, one moving and the other stationary, and having circular apertures in the plates, has been used to cut oats; but it has not proved to be practical, by reason of its tendency to clog, and it is not adapted to produce meal of uniform size.

In my apparatus, on the other hand, the thickness of the whole number of plates is such that with proper motion no kernel can escape the action of the cutters in any part of its length, and the parts or slices into which it is cut are uniform, by reason of the uniformity in thickness in the plates.

Figure 1:
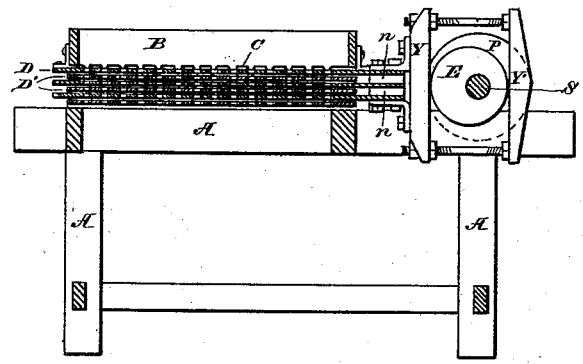
Figure 2:
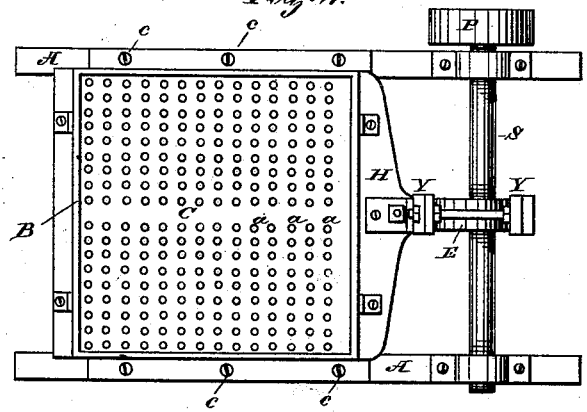
Figure 3:
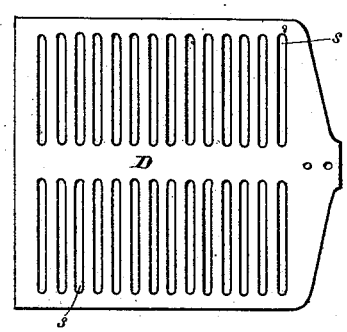
Figure 4:
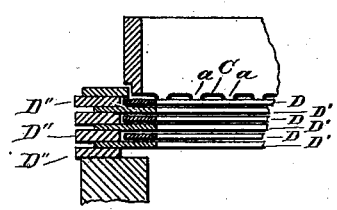
Figure 5:
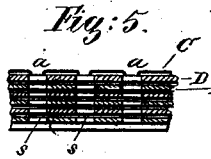
Figure 6:

In the drawings, Figure 1 is a central vertical section of the machine. Fig. 2 is a top view. Fig. 3 is a plan view of one of the reciprocating plates detached. Fig. 4 is a fragmentary view of the machine in transverse section through the hopper and plates, showing the slots of both series of plates coincident. Fig. 5 is a fragmentary view of the plates and hopper-bottom in longitudinal section of the machine, showing the slots of the two series coincident. Fig. 6 is a view similar to that in Fig. 5, but showing the reciprocating plates at half-stroke.

A is a wood frame supporting the working mechanism. B is a hopper or shallow receptacle, having the bottom C of sheet metal.

D and D' are alternating series of reciprocating and stationary slotted plates, the former secured to move with the hopper, and having the upper one of the series located immediately beneath the hopper-bottom C. These alternating plates run closely, but with necessary freedom, upon or between each other, the fixed ones being spaced by the strips D''. (Shown in transverse section in Fig. 4.)

The fixed plates extend laterally to be clamped with the spacing-strips D'' upon the side rails of the frame by the screws or bolts $c$.

The moving plates extend beyond the hopper and the other plates at one end to form the head H for the connection of the yoke Y, and they are here held at suitable distance apart within the yoke-connection by the spacing-blocks $n$, Fig. 1.

S is a shaft mounted in bearings resting upon the frame, as shown, having the driving-pulley P. An eccentric, E, is fixed to the shaft S, which works the reciprocating plates D and hopper B by means of the yoke Y Y'.

The plates are arranged and the throw of the eccentric is so adjusted that the slots in the several series of plates will coincide at both extremes of the throw.

The punctures $a\ a$ in the hopper-bottom C are of proper size to freely admit a single grain each, and are so made as to have the counter-sunk form on the upper surface of the plate, (shown in the several figures,) for the purpose of facilitating their entrance.

Oats admitted to the hopper are ended up by the motion given the hopper, and enter the apertures $a$, and passing through them are received into the slots $s$ in a vertical position, when the latter are coincident in both series, or at either end of the throw of the eccentric E. The slots are materially larger than the thickness of the grain, so that the latter falls freely; but the rapidity of the movement given the plates D is such, with reference to the velocity of the grain as a falling body, that no portion of a kernel can escape uncut in proper size by some one of the numerous cutting slot-edges. The result is, that the plates being of the thickness required of the slices, the entire grain is cut into slices of substantially uniform length.

As the slots of the two series of plates coincide at both extremes of the eccentric throw, whole grain is received and fragments discharged twice in each revolution of the eccentric, which makes the operation of cutting in the utmost degree rapid. Moreover, since each grain is pressed at several points on each side thereof in the operation of cutting them the tendency of the hull to draw in between the plates and to thereby clog the machine is avoided. This end is further attained by the straight form of the cutting-edges, by which they bear upon less area of the cylindric coat of the grain at the first impact, and thereby more quickly and perfectly cut the coat or hull instead of drawing it inward between the plates, and also by the greatly-increased extent of cutting-edges in the slots as compared with the cutting-edges of circular orifices. Thus, while a kernel can only enter through one of the circular orifices in the hopper-bottom, its sliced fragments may move downward through the slots at any intermediate point, and thus tendency to clog is avoided.

Having thus described my invention, I claim—

An oatmeal or grain cutter having the alternating stationary and reciprocating plates D and D', provided with slots $s$, and combined with the hopper-bottom C, provided with the circular apertures $a$ $a$, substantially as described.

In testimony that I claim the foregoing as my invention I affix my signature in presence of two witnesses.

ALEXANDER SCOULLER.

Witnesses:
  CALVIN MANNING,
  W. H. McGLASHON.